June 23, 1959 T. A. SHANK 2,891,596
MANIPULATING MECHANISM FOR HEAVY DUTY METAL WORKING PRESSES
Filed July 8, 1953 13 Sheets-Sheet 1

INVENTOR
Thomas A. Shank
BY
ATTORNEY

June 23, 1959 T. A. SHANK 2,891,596
MANIPULATING MECHANISM FOR HEAVY DUTY METAL WORKING PRESSES
Filed July 8, 1953 13 Sheets-Sheet 3

INVENTOR
Thomas A. Shank
BY
ATTORNEY

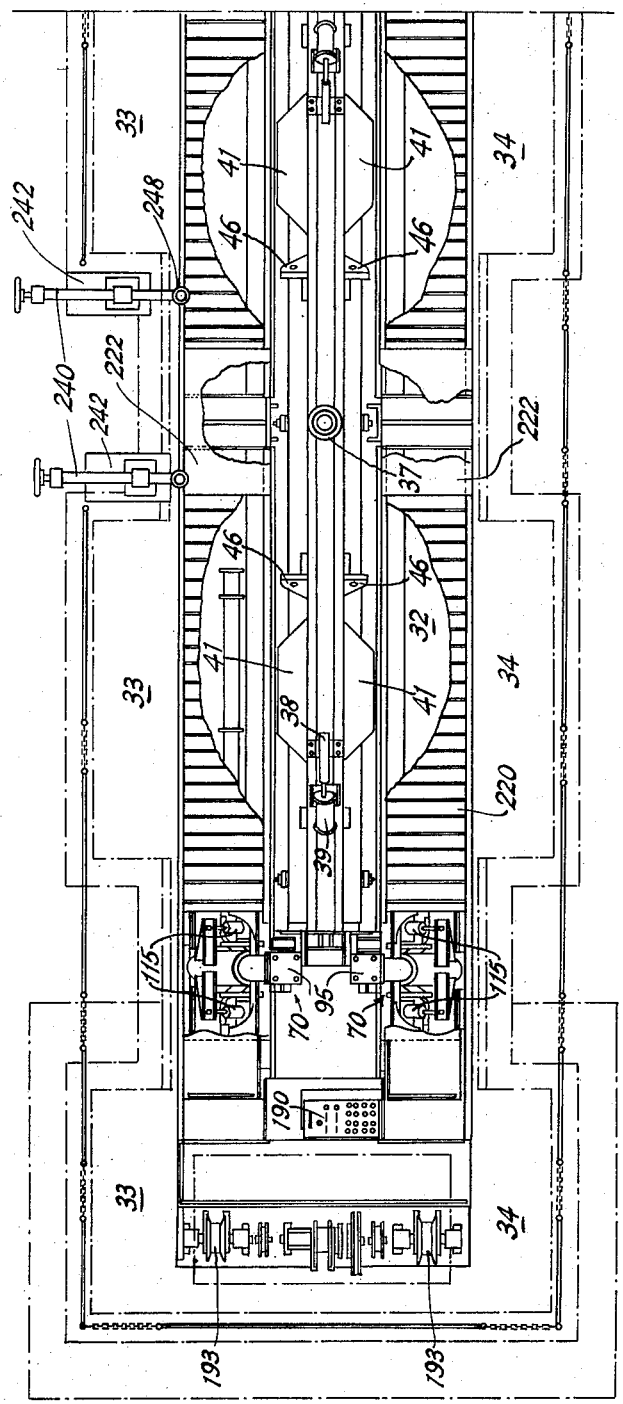

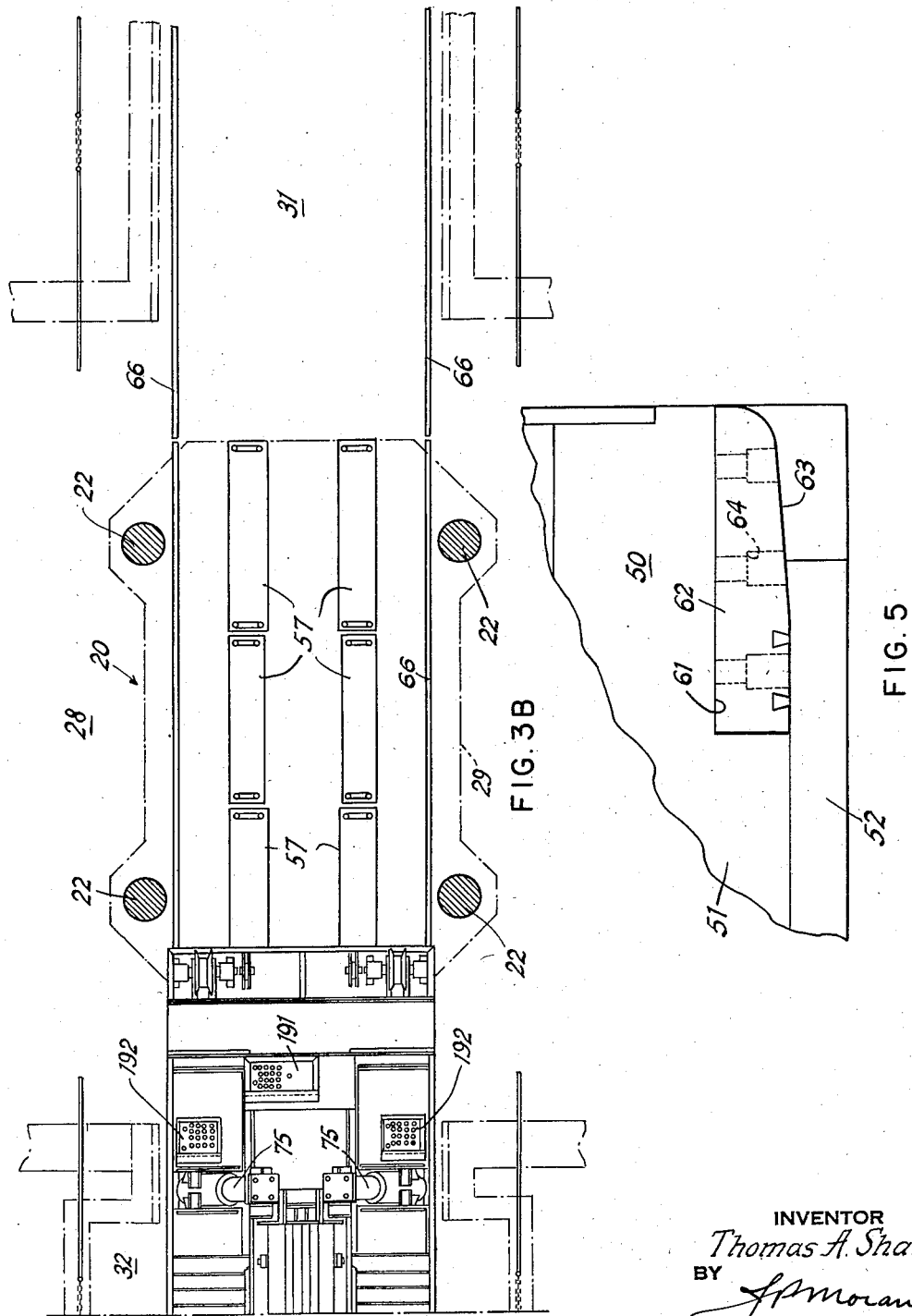

June 23, 1959 T. A. SHANK 2,891,596
MANIPULATING MECHANISM FOR HEAVY DUTY METAL WORKING PRESSES
Filed July 8, 1953 13 Sheets-Sheet 8

INVENTOR
Thomas A. Shank
BY
J. P. Moran
ATTORNEY

June 23, 1959  T. A. SHANK  2,891,596
MANIPULATING MECHANISM FOR HEAVY DUTY METAL WORKING PRESSES
Filed July 8, 1953  13 Sheets-Sheet 9

INVENTOR
*Thomas A. Shank*
BY
ATTORNEY

June 23, 1959  T. A. SHANK  2,891,596
MANIPULATING MECHANISM FOR HEAVY DUTY METAL WORKING PRESSES
Filed July 8, 1953  13 Sheets-Sheet 10
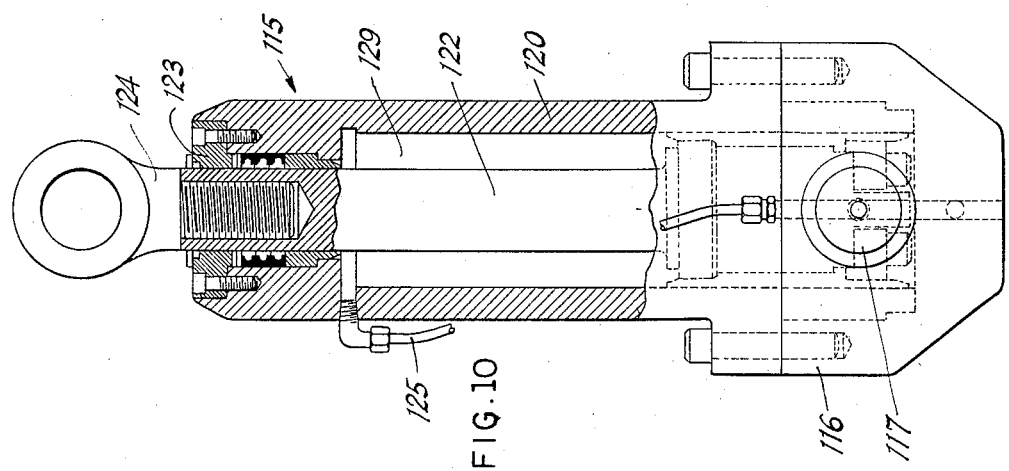
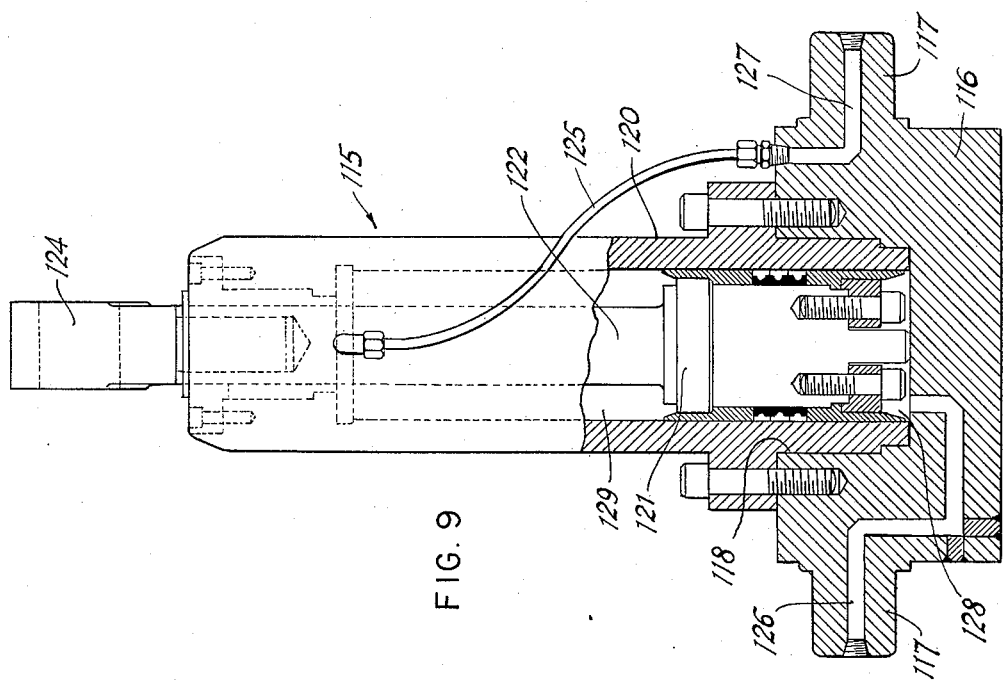
INVENTOR
Thomas A. Shank
BY
J.P. Moran
ATTORNEY

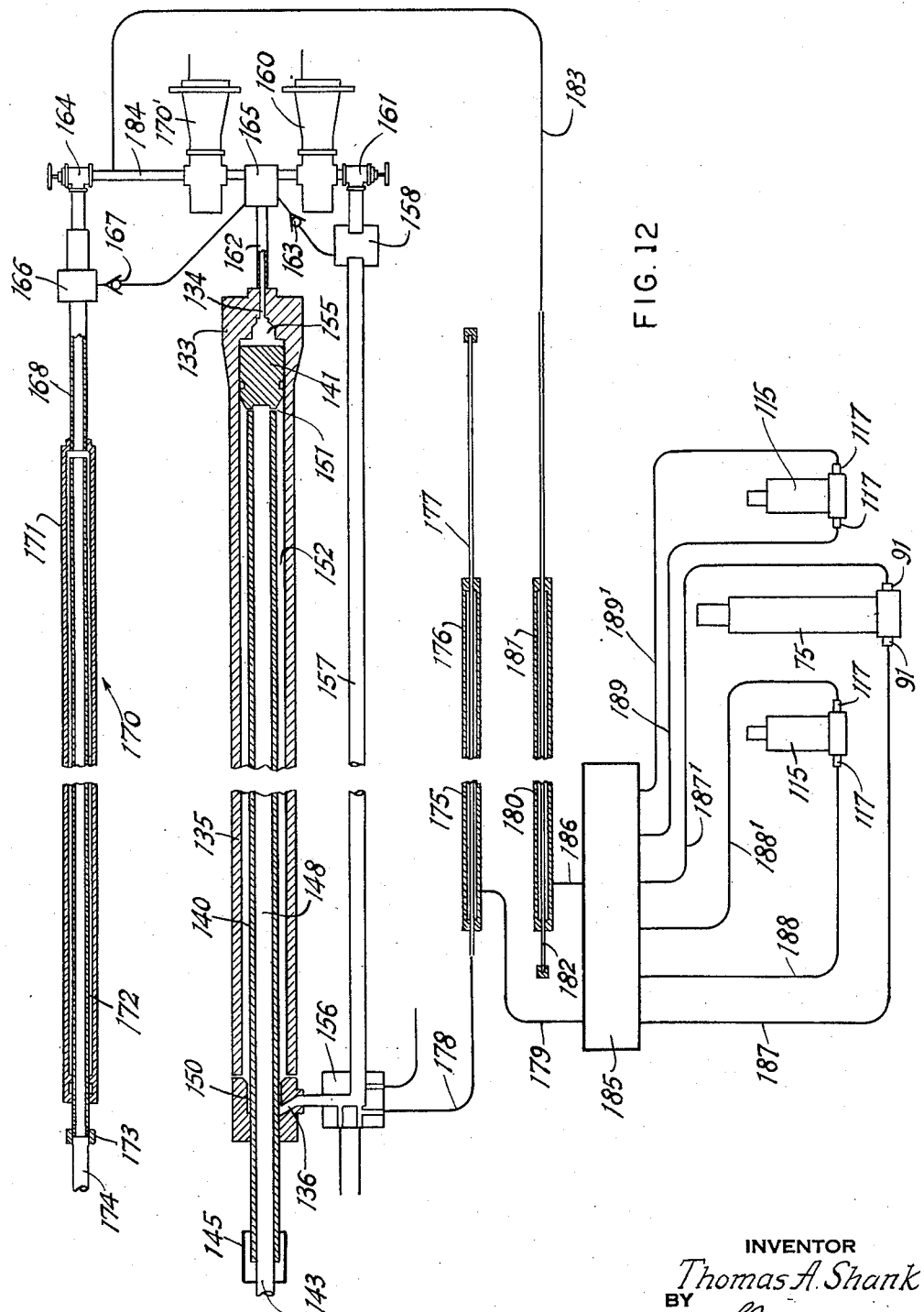

June 23, 1959 T. A. SHANK 2,891,596
MANIPULATING MECHANISM FOR HEAVY DUTY METAL WORKING PRESSES
Filed July 8, 1953 13 Sheets-Sheet 12

INVENTOR
*Thomas A. Shank*
BY
*J. P. Moran*
ATTORNEY

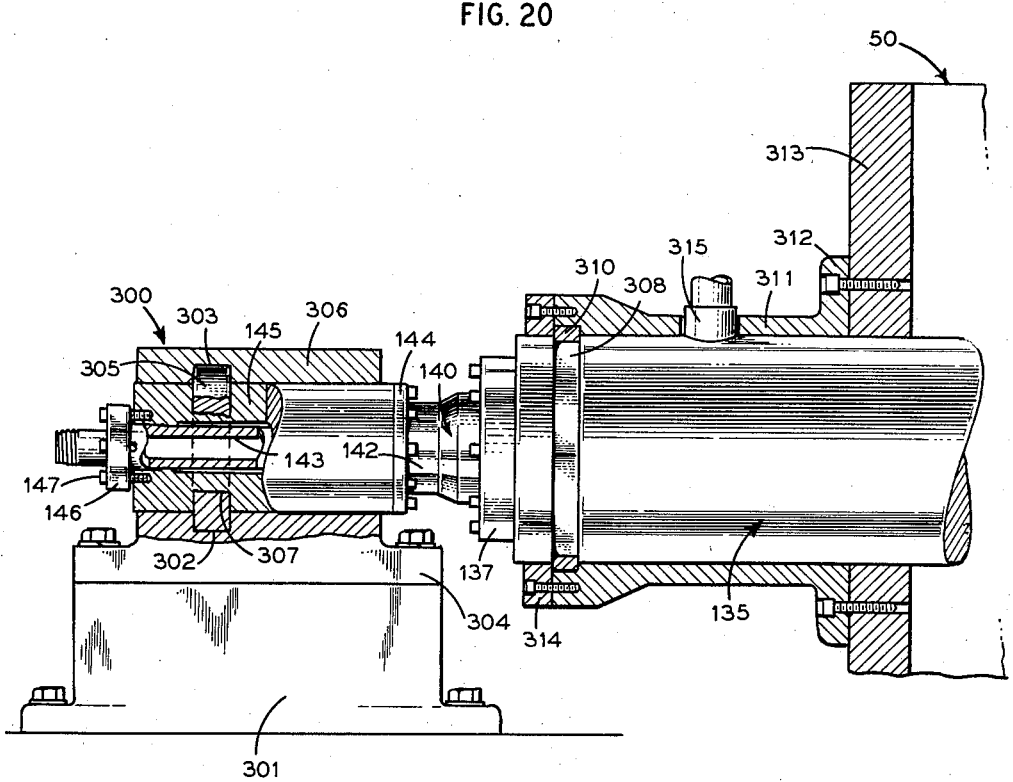

United States Patent Office 2,891,596
Patented June 23, 1959

2,891,596

MANIPULATING MECHANISM FOR HEAVY DUTY METAL WORKING PRESSES

Thomas A. Shank, Barberton, Ohio, assignor to The Babcock & Wilcox Company, New York, N.Y., a corporation of New Jersey Application July 8, 1953, Serial No. 366,664

19 Claims. (Cl. 153—48)

This invention relates to relatively heavy duty metal working presses and, more particularly, to novel workpiece and press component manipulating mechanism for such presses.

In the metal working industry, there is a trend toward the use of presses of relatively high capacity. This trend has been at least partially due to the economies involved in making and forming large components as a single piece and in a single operation rather than as a fabricated structure. A typical example is the formation of whole aircraft components in a single operation. Other presses of high capacity have been designed for forming heavy plates for large capacity pressure vessels. For example, in forming long pressure vessels, the shell thereof may be constructed of only a relatively few pieces, each being the full length of the cylindrical portion of the shell and each having a width encompassing a considerable portion of the shell circumference. This reduces the number of joints, usually welded seams, in the cylindrical section to only a very few longitudinally extending seams, thus eliminating the multiplicity of horizontal or girth seams necessitated when using shorter sections to form the shell.

The operating pressures involved in these heavy duty presses, together with the structural requirements necessitated by the large sizes of the workpieces operated upon, require a relatively massive overhead structure both to support the upper work engaging member of a vertical press and to support the operating mechanism therefor, which is usually a high pressure hydraulic system. This relatively massive superstructure has the disadvantage that it interferes with the movement of the large sized workpieces, such as large sized metal plates, into and out of the press, thus limiting the capacity of the press.

It has been customary, in the usual case, to handle the workpieces by means of overhead cranes and the like, and the massive superstructures of the newer, high capacity presses render it difficult for an overhead crane to properly position work in the press. Additionally, difficulty is experienced in using overhead cranes and the like to remove press components, such as the upper beam for example, for interchange, replacement, inspection, or repair. These factors have unduly lengthened the handling time required in charging and discharging heavy duty presses, and have thus detracted from the efficiency of utilization. With the high capital investment required for such heavy duty presses and their associated high pressure hydraulic operating systems, it is desirable that the presses turn out as many pieces per unit of time as can feasibly be accomplished.

With the foregoing in mind, the present invention is directed to a novel manipulating mechanism for handling workpieces into and out of a heavy duty press, and for facilitating the interchange of press components, such as the upper beam or work engaging means of a bending press, for example. A corollary advantage of the invention system is that it permits the press to be used for functions other than bending of plates or the like, such as for the forming of hemispherical end shells for pressure vessels, heavy duty piercing, etc.

To this end, the invention arrangement provides a relatively massive elongated lower beam, or work supporting member, for a heavy duty press, which work support is mounted on ways for longitudinal movement into and out of operative relation with the press superstructure and for longitudinal adjustment relative to the superstructure. Associated with this lower beam or work support, and mounted for movement parallel therewith and closely adjacent thereto, are a plurality of upwardly extending, transversely tiltable manipulating units. These units preferably comprise hydraulic actuators which are tiltably mounted on carriages movable along rails on either side of the ways mounting the lower beam. Each manipulating unit includes selectively operable clamping means by virtue of which the manipulating units can be selectively clamped in fixed position to the rails or clamped to the lower beam for movement by the latter. Such clamping means are individual to each manipulating unit, so that movement of the lower beam may be utilized to selectively position each individual manipulating unit relative to the lower beam or relative to its line of movement.

The upper beam, or work engaging member, of the press is detachably securable to the upper press platen connected to the press operating components, usually one or more high pressure hydraulic cylinders. Accordingly, the lower beam and manipulating units may be moved into the press and the maniplulating units operated to pick up the weight of the upper beam. The latter can then be disengaged from the upper press platen for support by the manipulators, whereupon the lower beam can be operated, with the manipulators clamped thereto, to carry the upper beam out of the press to clear the press for other operations, and to support the upper beam outside the press during these other operations.

The outer area of travel of the lower beam is located in a working space having very substantial vertical clearance so that overhead cranes or the like may be freely used to lift the upper beam from the manipulator units and remove it. More importantly, with the manipulator units retracted downwardly, the upper surface of the lower beam is clear so that an overhead crane may be used to position a relatively massive workpiece, such as a large heavy plate, onto the work supporting surface of the lower beam and to interchange dies from the surface of the lower beam by the overhead crane. The manipulating units may then be individually operated, both as to vertical movement and tilting movement, to properly position the workpiece on the work supporting surface. To facilitate this positioning, adjustable feeler gauges are mounted along the path of movement of the lower beam, on either side thereof, for engagement with the workpiece edges to adjust the position of the latter correctly on the work supporting surface. Also located along the path of movement of the lower beam, outwardly of the press, are longitudinally fixed, inwardly tiltable supporting frames which are arranged to receive the upper beam from the manipulating units, when the upper beam has been carried out of the press supported on such units, to store the upper beam while permitting the lower beam and its associated manipulating units to be used otherwise.

A further feature of the invention is the novel means for supplying high pressure hydraulic fluid to the operating means for the lower beam and to the hydraulic actuators of the manipulating units. To this end, the operating means for the lower beam comprises a cylinder fixed to the lower beam and containing a movable piston head secured to a tubular piston rod which has its outer end fixed against movement. The inner end of the piston rod, just outwardly of the piston head, is formed for communication with the annular working space between the piston rod and the inner surface of the cylinder. The main source of hydraulic pressure fluid is connected to the fixed outer end of the tubular piston rod and thereby is in constant communication with such annular working space.

A manifold is fixed for movement with the lower beam and connected, at one end, to such annular working space and, at the other end, through pressure actuated valve means to the cylinder space "above" the piston head. This latter space is also connected, through pressure actuated control valve means, to a movable section of a telescoped-section exhaust manifold having a relatively fixed section connected to the return line to the source of high pressure operating fluid. Telescoped manifolds connect the pressure sides of the hydraulic actuators of each manipulating unit to the aforementioned pressure manifold movable with the lower beam, and other telescoped-section exhaust manifolds connect the exhaust ports of the manipulating unit hydraulic actuators to the movable section of the main exhaust manifold. Due to the tilting mounting of the hydraulic actuators on their carriages, the pressure and exhaust connections of the actuators are made thereto through trunnions mounting the actuators for such tilting movement.

The invention manipulating mechanism also includes novel and anti-creep means for maintaining the desired position of the lower beam during a metal working operation. This latter means comprises control elements for the supply of hydraulic fluid to the actuator for the lower beam, and a member movably mounted on the lower beam and selectively projectable into contact with the supporting surface for the lower beam. Should the lower beam tend to "creep," this member is thereby moved to operate the control elements to provide a position-restoring corrective power impulse to the actuator for the lower beam.

For an understanding of the invention principles, reference is made to the following description of typical embodiments of the invention as illustrated in the accompanying drawings.

In the drawings:

Fig. 1 is an end elevation view of a heavy duty metal working press embodying the invention;

Figs. 2A and 2B conjointly provide a complete side elevation view of the press and the manipulating mechanism of the invention;

Figs. 3A and 3B conjointly provide a complete plan view, partly in section, of press components and the manipulating mechanism;

Fig. 5 is an enlarged detail side elevation view of the lower end corner of the lower beam;

Figs. 9 and 10 are elevation views, at right angles to each other and partly in axial section, of one of two identical tilting cylinders provided for each manipulating unit;

Fig. 12 is a partial schematic diagram of the hydraulic supply system for the invention apparatus;

*General description*

Figure 1:
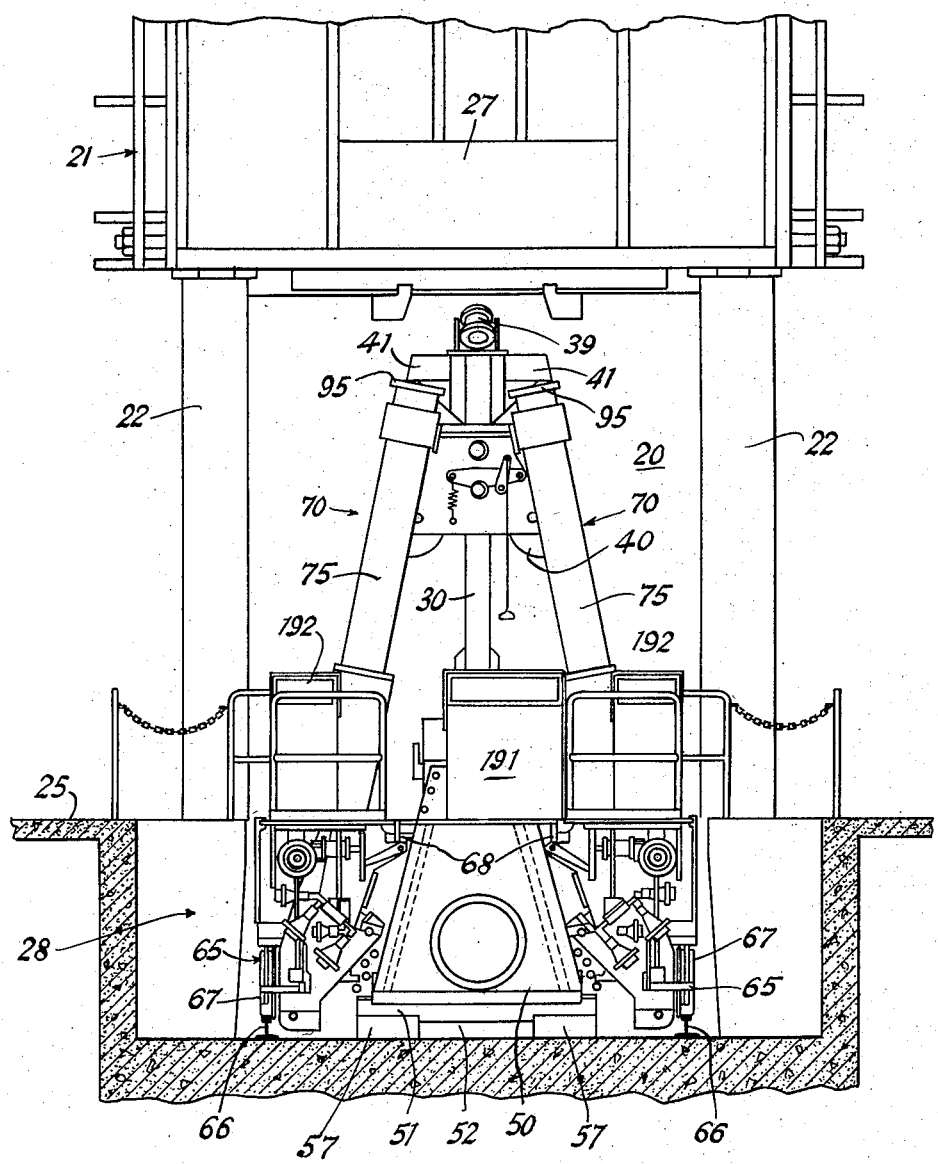
Figure 2A:
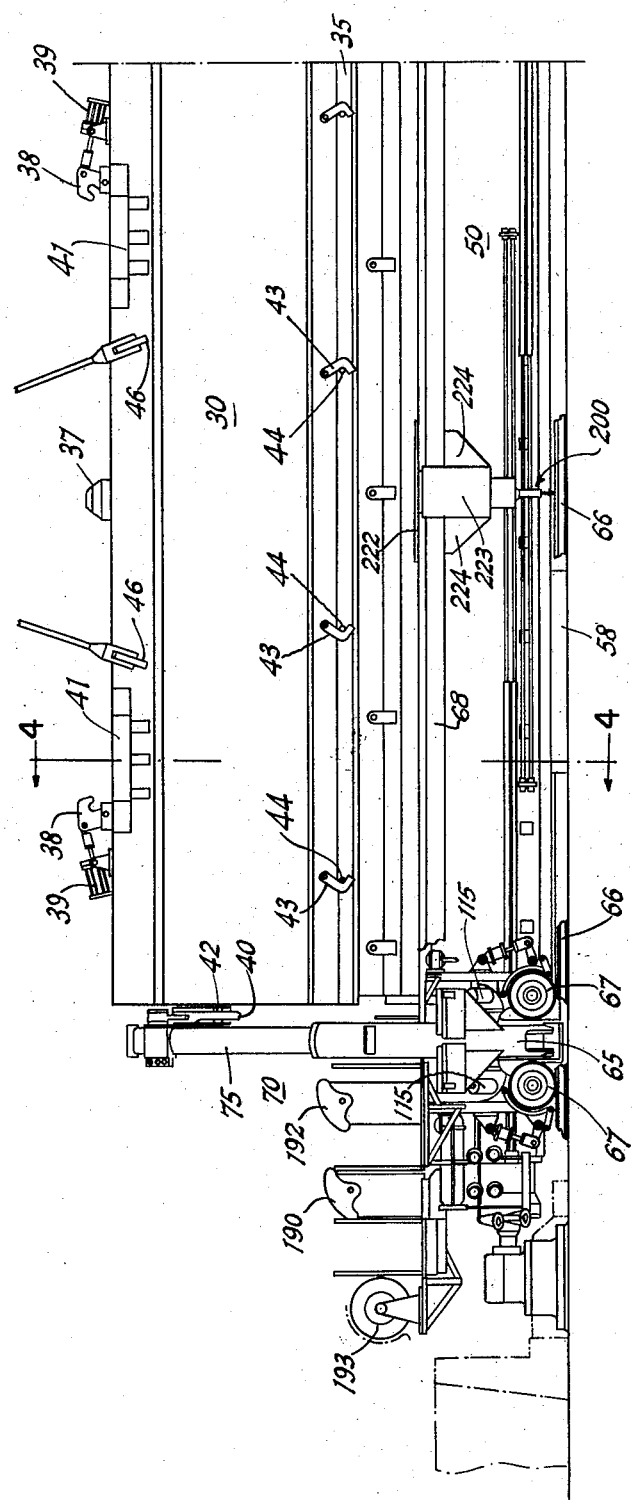
Figure 2B:
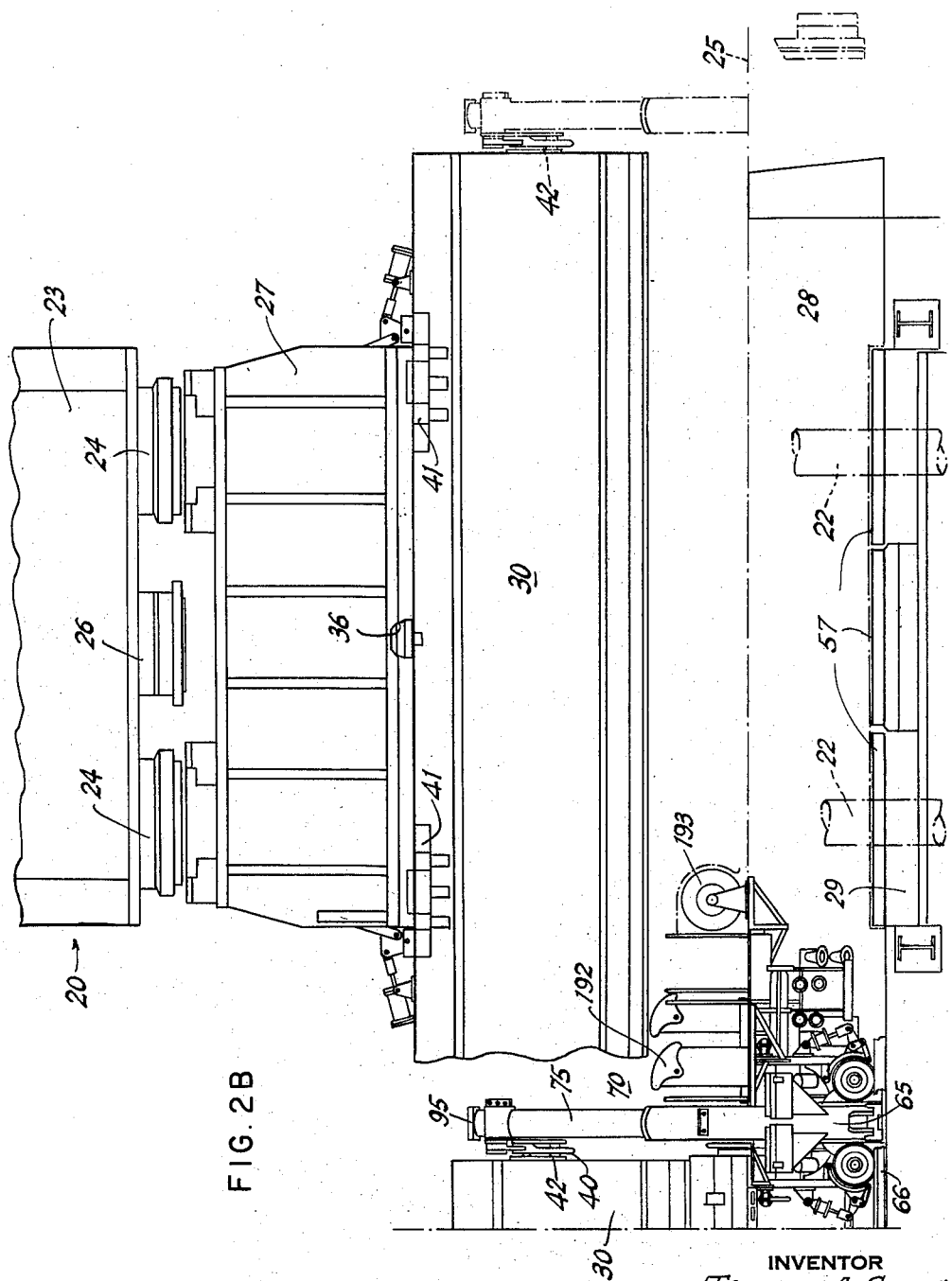

Referring first to Figs. 1–4, the invention work and press component manipulating mechanism is illustrated as applied to a multipurpose press 20 having a generally upwardly or vertically extending superstructure, indicated as a whole at 21. The superstructure may include columns 22 which are supported on firm foundations a substantial distance beneath the working level or floor 25 of the building housing the press, such deep foundations for presses of this type being well known in the art and hence not specifically illustrated or described herein. The superstructure further includes an upper or head structure 23 which supports, in the specific example selected for the illustration, three high pressure, hydraulically operated cylinder-piston actuators, or hydraulic rams, 24, 24 and 26. The end rams 24 have secured thereto the upper platen 27 of press 20.

In the specific example shown, press 20 is a 6500-ton press of a multipurpose type supported on four columns 22 on 14 x 16 foot column centers. The platen has a span of 25 feet and there is a working clearance between the upper and lower press components of 20 feet. The press is designed primarily for bending heavy plate for use in forming thick walled pressure vessels, such as boiler drums and the like. For this purpose, it is designed to handle plates having a net weight of up to 50 tons, widths of up to 10 feet, and lengths of up to 42 feet.

The press may also be used for other functions, such as forming hemispherical heads for pressure vessels and for piercing. The several operations are effected by the three main cylinders 24, 24 and 26, and these cylinders may be used either singly, in pairs, or all three at once. In the piercing and head forming operations, generally only the center cylinder 26 is used. For the forming and bending of heavy plate, the two outer cylinders are used together, or all three cylinders may be used. The full capacity of 6500 tons pressure is attainable only when using all three rams, the effective press pressure being proportionately reduced when only two rams or only one ram is used.

Operating pressure for the press, for movement of the lower beam and for actuating the hydraulic rams of the manipulating units, is provided by a 3,000 p.s.i. hydraulic system. In the particular example illustrated, this pressure is supplied from high pressure accumulators which are recharged, during idling periods, by suitable pumps, the supply system forming no part of the invention and thus not being illustrated.

The press 20 is set in a relatively large pit 28 extending several feet below the level of operating floor 25, and whose floor is the top of the lower press platen 29 forming part of the press foundation and taking the forces from columns 22. A relatively narrower pit 31 extends longitudinally in one direction from pit 28 and press 20, having its base at substantially the same level as that of pit 28, and a much longer, equally deep pit 32 extends from the other end of pit 28 and press 20 in longitudinal alignment with pit 31. Referring to Figs. 3A and 3B, it will be noticed that the sides of pit 32 have longitudinally spaced offsets providing working spaces 33 and 34 for access to the press lower beam and the manipulator units when the beam is moved out of the press and into pit 32.

The latter has a length substantially equal to or slightly greater than the length of the press lower beam.

The press upper platen 27 has a centrally located socket 36 for receiving a locating abutment or spike 37 on the upper edge of the press upper beam 30. The upper surface of beam 30 also carries, at each end thereof, pivotally mounted hooks or wedges 38, 38 operated by air cylinders 39, 39 and engageable with suitable means on each end of the press platen 27 to secure beam 30 for movement with the press platen. Inwardly of hooks 38, the upper edge of beam 30 has integrally secured therewith laterally projecting abutments 41 which serve to stabilize the beam, when attached to the upper platen, in a lateral direction which under loading of the press. They are also used to support the beam on its storage frames when the beam 30 is removed from press 20. The upper beam also has lugs, or the like, 42 on either end which are engageable by hooks 40 on the manipulating units for handling of the upper beam.

Near its lower edge, upper beam 30 carries a series of hooks 43 engageable selectively with pins 44 on an upper die 35, dies 35 thus being interchangeably connectible to beam 30. Beam 30 is also provided with a spaced pair of lugs 46 which may be engaged by crane hooks, slings, or the like, for transporting the beam relative to the press working and work loading areas.

The movable lower beam

Figure 4:
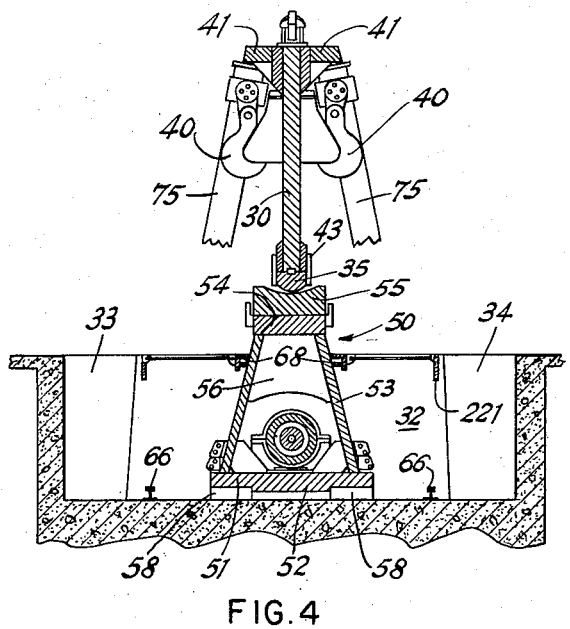
Fig. 4 is a vertical cross sectional view, on the line 4—4 of Fig. 2A, showing the press lower beam, or work supporting means, with the removable press upper beam, or work engaging means, supported thereon by the manipulating mechanism.

The lower beam 50 is a relatively massive composite structure having the general cross section of a trapezoid as may be best seen in Figs. 1 and 4. More particularly, beam 50 includes a relatively massive base 51 having a central rib 52, inwardly slanting side walls 53, 53 and an upper die supporting surface 54 which is machined to a flat finish to interchangeably support dies 55. The beam structure is internally braced as at 56.

Beam 50 is longitudinally movable relatively to press 20, through the pits 28, 31 and 32, on sets of cast iron ways generally indicated at 57 and 58, the ways 57 being disposed within pit 28 on the lower press platen 29 and having an overall length substantially less than the overall length of beam 50 and substantially equal to the length of the lower press platen. Ways 58 are disposed in pit 32, and the ends of ways 58 nearest ways 57 are longitudinally spaced from the latter by a substantial distance which is, however, less than the overall length of beam 50. Each set of ways comprises parallel, transversely spaced, longitudinal lines of cast iron blocks formed with suitable means for supplying lubricant to the upper surfaces of the blocks. The lines of blocks have their inner edges spaced apart by substantially the width of rib 52 on bottom member 51 of beam 50, so that this rib cooperates with the ways to guide the beam 50 during its longitudinal movement.

Due to the fact that ways 57 are substantially shorter than beam 50, the ends of beam 50 substantially overhang ways 57 when the beam is either centered in the press or offset therefrom somewhat into pits 31 or 32. This allows the ends of beam 50 to deflect under the bending moments resulting from the applied force of the press. As upper beam 30 is forced against a workpiece on lower beam 50, the reaction transmitted through columns 22 tends to force lower beam 50 upwardly adjacent its longitudinal center. Should the beam ends not be allowed to have this deflection, but be held rigidly against downward movement, this reaction exerted by the press and transmitted to the longitudinal center of beam 50 would be sufficient to lift the press from its foundations.

The bottom member of beam 50 is formed to suitably guide the beam for engagement with ways 57 or 58 when the beam is moving off one set of ways and onto the other set of ways. This guiding means is best illustrated in Fig. 5. The bottom member 51 of beam 50 is formed with longitudinally extending, substantially rectangular cross section, and downwardly facing recesses or notches 61 at each outer corner. Set into each notch 61 is a "sled runner" 62 whose lower edge is bowed forwardly and upwardly as indicated at 63, member 62 being held in position by suitable fastening elements located in recesses 64 and engaged into beam lower member 51. As the beam 50 moves off one set of ways and toward the other set, surfaces 63 of runners 62 guide the beam smoothly onto the other set of ways. The means for moving beam 50 longitudinally of the press will be described in detail hereinafter.

The manipulators

Extending parallel of the path of movement of beam 50, through the pits 28, 31 and 32, are rails 66 which are located in laterally spaced relation to either side of the ways 57 and 58. These rails serve to support the four manipulating and work handling units associated with beam 50 and generally indicated at 70. Each unit comprises a hydraulic ram or actuator 75 mounted on a wheeled carriage generally indicated at 65. Carriages 65 have flanged wheels 67, on their lower outer edges, guided along rails 66, and the upper inner edges of the carriages 65 are formed to hook beneath rails 68 extending along the sides of beam 50 adjacent its upper longitudinal edges, and carry bearing shoes 89' (Fig. 7) engaging the outer surfaces of rails 68. The hydraulic rams or actuators 75 are tiltably mounted on carriages 65 for swinging movement transversely of beam 50, and the carriages 65 are provided with selectively operable clamping means by virtue of which the carriages may be secured against movement on rails 66 or secured to rails 68, for adjustment along beam 50.

Figure 6:
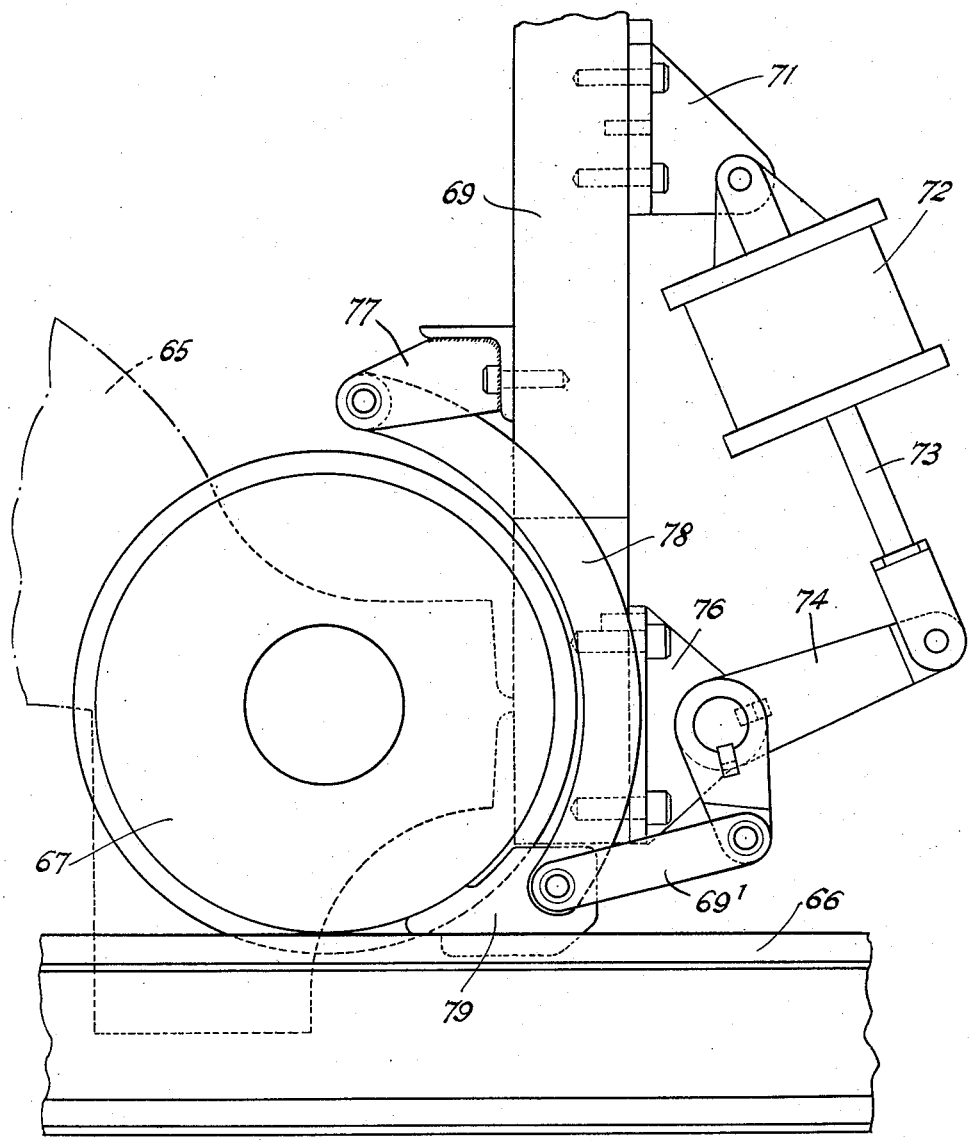
Fig. 6 is an elevation view of a track brake or clamp for a manipulating unit.

The means for selectively clamping the units 70 to rails 66 is best illustrated in Fig. 6. Referring to this figure, a vertically extending member 69, forming part of the frame of carriage 65, has an ear 71 on which is pivotally mounted an air cylinder 72. The piston rod 73 of this cylinder is connected to one end of a bell crank 74 pivoting on an ear 76 secured to member 69. An ear 77 on the opposite end of member 69 has pivotally depending therefrom a curved link 78 carrying a chock 79 pivoted on its lower free end and arranged to be wedged between a wheel 67 and rail 66. A link 69' connects chocks 79 and the lower end of link 78 to the other arm of bell crank 74. Two of these clamping or chocking arrangements are provided on each carriage 65 and are simultaneously operated. When air pressure is admitted to cylinder 72 in a direction to force rod 73 outwardly, the crank 74 is swung in a direction to force chock 79 between wheel 67 and rail 66. To release the clamp, the operation of cylinder 72 is reversed to retract rod 73 and thus swing link 78 to pull chock 79 out of its wedging position.

Figure 7:
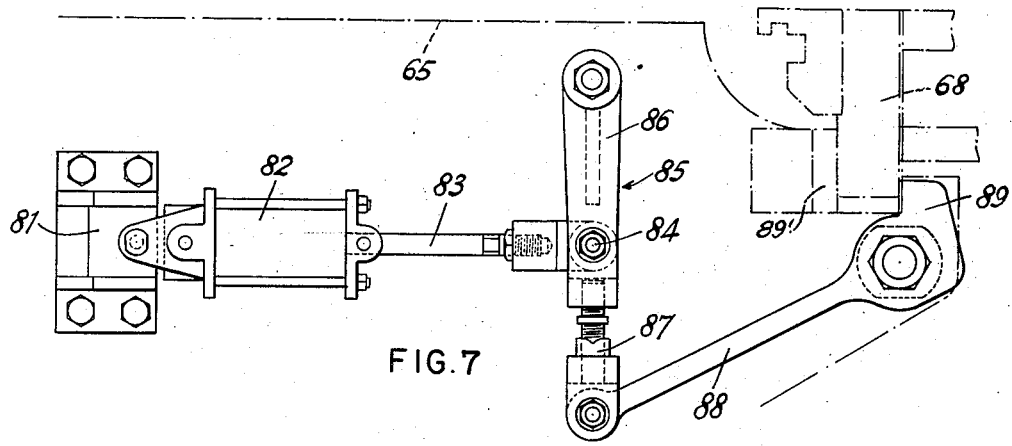
Fig. 7 is an end elevation view of means for clamping a manipulator unit to the lower beam.

The means for clamping each unit 70 to lower beam 50 for movement therewith is best shown in Fig. 7. Referring to this figure, a support 81 on the carriage frame has pivotally connected thereto an air cylinder 82 having a piston rod 83 connected to the hinge 84 of a toggle joint generally indicated at 85. The upper arm 86 of joint 85 is pivotally connected to the carriage frame and the lower arm 87 is pivoted to a link 88 swingably mounted on the carriage frame and having a projection 89 selectively engageable with the guide rail 68 on lower beam 50. When air is admitted to cylinder 82 to project rod 83, the toggle joint 85 is straightened to the illustrated position, rotating link 88 counter-clockwise to clamp rail 68 between bearing shoes 89' and projection 89. Operation of air cylinder 82 to restract rod 83 "breaks" the toggle joint to swing link 88 clockwise to release the clamp.

Figure 8:
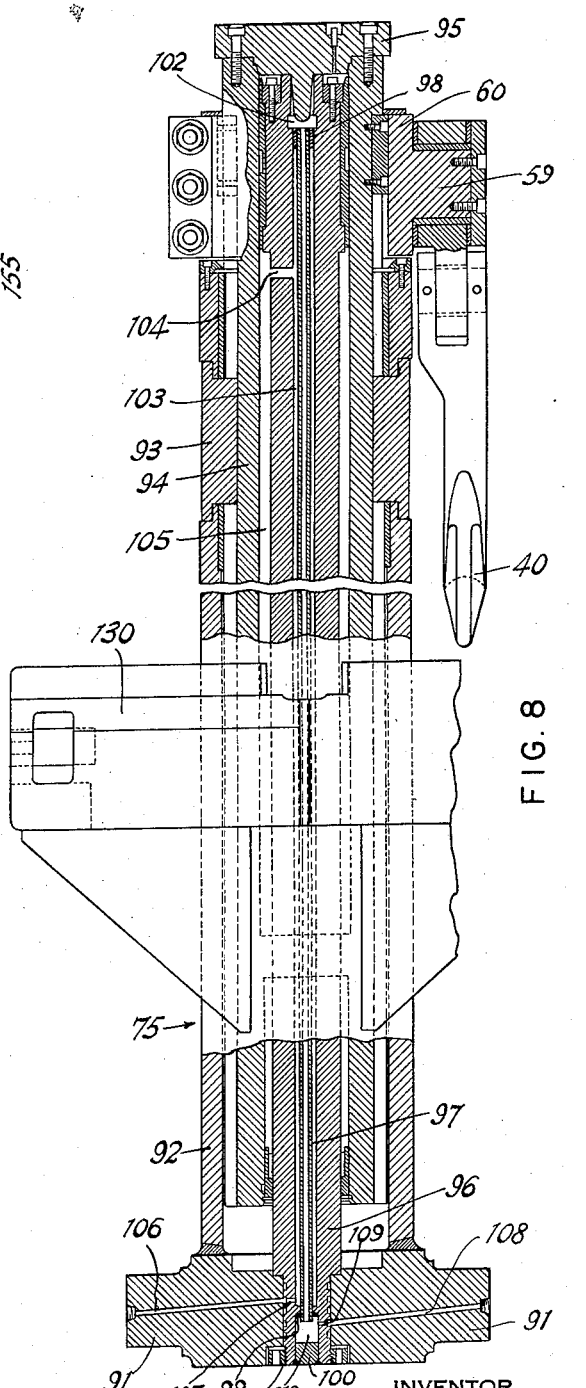
Fig. 8 is an axial sectional view through the hydraulic actuator of one of the manipulating units.

The hydraulic rams or actuators 75 are shown in greater detail in Fig. 8. Each actuator includes trunnions 91, 91 arranged to be mounted in trunnion bearings on carriages 65. Extending from the trunnions is a tubular outer sleeve 92 having an annular bushing 93 carrying diametrically opposite keys 93' riding in keyways in a tubular piston 94 having a head 95 forming a work or press component engaging element. Telescoped within piston 94 and secured at its lower end to trunnions 91, is a tubular piston rod 96 having a tube 97 extending axially therealong. Sealing arrangements 98 and 99 are provided between piston rod 96 and tube 97 at each end of the tube. The lower end of the piston rod is reduced in section and threaded into a suitable diametric passage through the trunnions 91, the extreme end of rod 96 being closed by a plug 100. Rod 96 is locked in trunnions 91 by a lock nut 101. Each unit 75 has its hook 40 mounted on a trunnion 59 projecting radially from a collar 60 embracing the upper end of piston 94.

The upper end of tube 97 opens into a central recess 102 in the upper end of rod 96, this recess being in full communication with the undersurface of head 95. The space 103 between rod 96 and tube 97 is connected by a port 104 to the annular space 105 between rod 96 and piston 94. As viewed in Fig. 8, a passage 106 extends from the center of the outer face of the left trunnion 91, through the trunnion in a non-axial direction, and communicates at its inner end with a port 107 in rod 96, this port being in communication with the space 103 above sealing arrangement 99. Similarly, a passage 108 extends from the center of the outer face of the right hand trunnion 91 in a non-axial direction through this trunnion and connects with a port 109 communicating with a space 110 beneath sealing arrangement 99.

The source of high pressure hydraulic fluid is connected to each carriage 65 in a manner described more fully hereinafter, and is directed in the carriage to the bearings receiving trunnions 91. Through the operation of air actuated valves, as described hereinafter, either passage 106 or 108 can be connected selectively to the pressure side of the hydraulic fluid source or to the exhaust side thereof. To extend actuator 75, fluid under pressure is admitted to port 108, and flows through port 109, space 110, and tube 97 into space 102. At the same time, passage 106 is connected to exhaust. The pressure fluid operates beneath head 95 to move piston 94 upwardly relative to rod 96. To retract the actuator, passage 108 is connected to exhaust and pressure fluid is admitted through passage 106 and port 107 into annular space 103, from which the fluid under pressure passes through port 104 into annular space 105 and serves to force piston 94 inwardly or downwardly along rod 96.

To tilt actuators 75 relatively to carriages 65 and laterally relative to lower beam 50, a pair of hydraulically operated tilting cylinders 115 are provided for each actuator. Each of these tilting cylinders, as best shown in Figs. 9 and 10, includes a trunnion block 116 carrying trunnions 117 mounted in suitable bearings on carriages 65. The trunnion block 116 has a cylindrical radial recess 118 in which is secured, in fluid-tight relation, the lower end of a cylinder 120. A packed piston 121 is slidably mounted in cylinder 120 and has a rod 122 secured thereto and extending through the head 123 of cylinder 120. A massive eye bolt 124 is secured in the end of rod 122 beyond head 123. Each trunnion 117 has a passage 126 or 127 extending axially inwardly therethrough. Passage 126 communicates with a space 128 beneath head 121. Passage 127 is connected by a conduit 125 to the space 129 above piston 121. By selectively connecting passages 126 or 127 to the pressure or exhaust sides of the source of pressure fluid, which, as explained, is connected to carriage 65 and from there to the bearings for trunnions 117, relative movement of cylinder 120 and piston rod 122 may be effected to tilt actuators 75. The eye bolts 124 are pivotally connected to a yoke 130 secured on guide tube or sleeve 92 of actuator 75.

*The hydraulic system*

Figure 11:
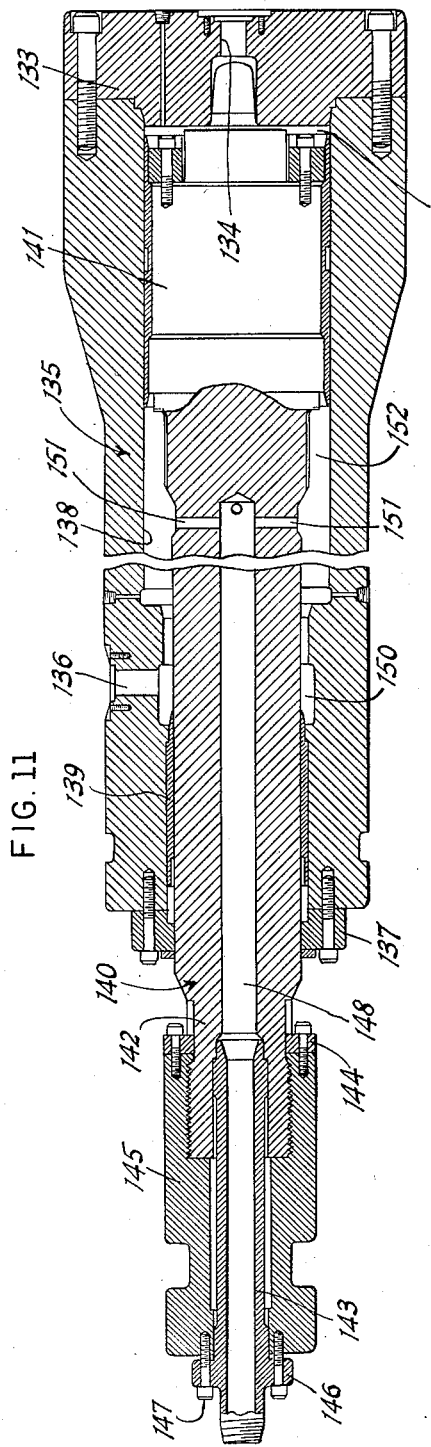
Fig. 11 is an axial sectional view through the hydraulic actuator for the lower beam.

The operating means for transferring lower beam 50 relative to the press comprises hydraulic ram or actuator including a cylinder 135 extending completely through and secured within the beam 50, and a hollow piston rod 140, as best seen in Figs. 4, 11 and 12. The end of cylinder 135 nearest the press is closed by a relatively massive head 133 having a port 134 extending axially therethrough for a purpose to be described. Adjacent its end furthest from the press, or at the outer end of lower beam 50, cylinder 135 has formed therethrough a radial port 136, likewise for a purpose to be described. This end of the cylinder has secured thereto an annular collar 137 embracing rod 140.

The rod 140 is generally tubular, and its end nearest the press carries a piston head 141 which rides in a portion of cylinder 135 having an enlarged bore 138. The rod 140 extends through a smaller bore portion of cylinder 135, in engagement with a suitable bearing 139. The outer end of rod 140 is reduced in diameter as at 142 and threaded into a deadman anchor 145 secured to the foundation. A clamping collar 144 locks rod 140 into anchor 145, the collar and rod being cooperatively formed to hold the rod against rotation. A relatively massive nipple 143 extends centrally through anchor 145 and seats in a recess in the outer end of rod 140. Nipple 143 is formed with a circumferential flange 146 through which the nipple is locked to anchor 145 by bolts 147, and is in axially aligned communication with the central passage 148 extending through rod 140 to a point adjacent piston head 141. At this point, rod 140 is formed with radial ports 151 connecting passage 148 with the annular space 152 between the rod and cylinder 135. This annular space, at its end furthest from the press, communicates with a circumferential groove 150 acting as a pressure distribution chamber having the port 136 extending therefrom. For reference purposes, the space between the outer face of piston 141 and cylinder head 133 is designated 155.

The nipple 143, which is fixed against movement by virtue of being locked in the deadman anchor 145, is connected to the pressure side of the high pressure hydraulic fluid source. Consequently, system pressure is always present in passage 148 and rod 140, annular space 152, distributing chamber 150, and port 136. The port 136 is connected to a distribution block 156 (Fig. 12) connected by a manifold 157 to a second distribution block 158. Blocks 156 and 158, and connecting manifold 157, are mounted on lower beam 50 for movement therewith. Through a shutoff valve 161, block 158 is connected to an air pressure operated control valve 160 which controls the flow of hydraulic pressure fluid to a manifold 165 connected by a conduit 162 to port 134 in head 133 and thus to the space 155. A check valve 163 interconnects block 158 and manifold 165 to act as a by-pass preventing intensification of the system pressure by forces applied to the actuator 135—140. An exhaust control valve 170 is also connected to manifold 165, and through a shutoff valve 164 to an exhaust block 166. A check valve 167 is provided between manifold 165 and block 166 and has the same function as check valve 163.

A conduit 168 connects block 166 to the exhaust manifold generally indicated at 170. This manifold comprises telescoped conduit sections, such as 171 and 172, with section 171 being secured relatively to block 166 and section 172 being anchored against movement by an anchor 173 connected by a conduit 174 to the return side of the system pressure source. Section 171 of the exhaust manifold, and the several blocks and valves just mentioned, are all secured for movement with the lower beam 50.

To transfer the lower beam into the press, valve 160 has operating air applied thereto to interconnect block 158 and space 155 above piston 141. Valve 170 is closed. This applies system pressure above piston head 141 and, due to the substantially larger area of the piston head exposed to space 155, as compared with the relatively small annular area exposed to space 152, the total pressure above the piston head is much greater than the total pressure in space 152, even though the unit pressures are substantially identical. Thus, cylinder 135 is forced outwardly along rod 140 to transfer the lower beam into the press. To retract the lower beam from the press, valve 160 is closed and exhaust valve 170' is air operated to the open position connecting space 155 to exhaust manifold 170. The continuously existing system pressure in space 152 acts between the inner face of the piston head 141 and cylinder 135 to draw the cylinder inwardly along rod 140.

The manifold 156, which is constantly under system pressure, also acts as a pressure distribution manifold for the hydraulic actuators 75 of manipulating units 70 and the tilting cylinders 115 associated with each actuator 75. Referring to the schematic diagram of the hydraulic system in Fig. 12, the controls and pressure support arrangement for one manipulating unit 70 are illustrated. Each manipulating unit 70 has associated therewith a telescoped-section pressure manifold 175 and a telescoped-section exhaust manifold 180. Pressure manifold 175 includes one relatively movable section 176 fixed relatively to the manipulating unit and a second relatively movable section 177 fixed relatively to cylinder 135 and connected to manifold 156 by a line 178. Similarly, exhaust manifold 180 includes a first movable section 181 fixed relatively to the manipulating unit and a second movable section 182 fixed relatively to cylinder 135 and connected, by a line 183, to the exhaust manifold block 166. The pressure controlling arrangement is schematically illustrated as including a multiple valve 185 connected to the pressure manifold 175 by a line 179 and to exhaust manifold 180 by a line 186. Lines 187 and 187' connect valve 185 to the trunnions 91 of actuator 75, lines 188 and 188' connect valve 185 to one tilting cylinder 115, and lines 189 and 189' connect valve 185 to the ported trunnions 117 and to the other tilting cylinder 115.

While only a single control valve 185 has been illustrated, to simplify the description and drawing, in actual practice valve 185 comprises three pairs of air operated, hydraulic fluid admission and exhaust valves. These valves are remotely controlled by flexible air lines on reels mounted on the lower beam structure, and the control air for the hydraulic valves is under the control of solenoid valves included in an electric interlocking control system. One set of valves is associated with each of the four manipulating units 70, two mounted on each side of the lower beam 50, as best seen in Figs. 2A through 3B.

The control of the transfer of the lower beam, and of the relative movement of the manipulating units 70, both longitudinally of beam 50 and in handling workpieces or press components, is effected from a group of control panels or stations, all interlocked together. Referring again to Figs. 1–3B, the control system includes a main control station 190 mounted on the outer end of lower beam 50. An auxiliary control station 191 is mounted on the end of beam 50 adjacent the press. In addition, each manipulating unit has an individual control panel or station 192 associated therewith. The electrical and air connections to the several control stations are made by electrical or air cables which are supported on suitable reels such as 193.

The main and auxiliary stations 190 and 191 have controls governing the movement of all four manipulating units 70 as well as the movement of beam 50 relative to the press. Each individual control panel 192 for a manipulating unit 70 has controls governing the operation and positioning of all four manipulating units. Interlocking arrangements are provided so that when a control element on one panel 192 is actuated, no corresponding control element on any other panel can be effective. Interlocks on main panel 190 similarly take over control from the panels 192 or auxiliary panel 191 when operation is desired from the main panel 190.

*Anti-creep arrangement*

Figures 13, 14:
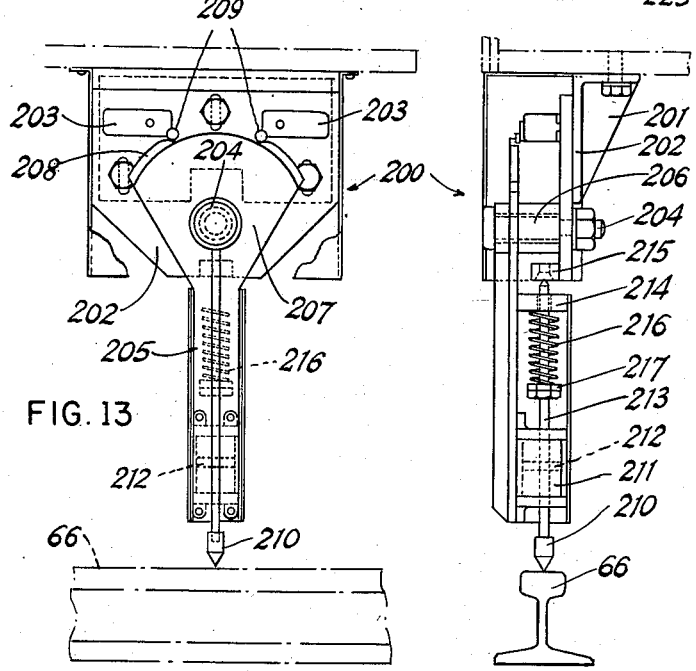
Figs. 13 and 14 are side and end elevation views, respectively, and partly broken away, of an anti-creep control device for the lower beam.

Creeping of lower beam 50 when it has been positioned relatively to the press is prevented by an anti-creep device generally indicated at 200 (Fig. 2A) and shown more particularly in Figs. 13 and 14. A bracket 201 secured to lower beam 50 supports a vertically extending mounting plate 202 on which are mounted a pair of snap action control switches 203, 203 which are connected to operate air valves controlling, in turn, the operation of valves 160 and 170 which control the movement of lower beam 50. Just below switches 203, plate 202 has a bolt and nut arrangement 204 projecting therefrom and carrying a spacing sleeve 206. Pivotally mounted on arrangement 204, and spaced from plate 202 by sleeve 206, is a pendulum 205 having a sector shaped operating head 207. The arcuate surface of head 207 has a pair of arcuate operating cams 208, each associated with an operator 209 for a different one of the switches 203. Cams 208 are so located that, in the plumb position of pendulum 205, both cams are out of operative engagement with their associated operators 209 but one or the other cam will move its associated operator upon movement of pendulum 205 in either direction from the plumb position.

Adjacent its lower end, pendulum 205 carries an air cylinder 211 having a piston 212 secured to a piston rod 213 extending completely through cylinder 211. The upper end of rod 213 is guided through a bracket 214 on pendulum 205 and is pointed for selective engagement in a conical socket in a latch plug 215 on plate 202. A spring 216 embraces rod 213 between lock 214 and an adjustable collar 217 on rod 213. Spring 216 biases rod 213 downwardly to force a detector point 210 on the lower end of rod 213 against a rail 66.

During transfer of lower beam 50, air pressure admitted to cylinder 211 forces piston 212 and rod 213 upwardly so that the upper end of the rod engaged in the recess of plug 215 to lock pendulum 205 in the plumb position. When beam 50 has been moved to its desired position, the air pressure is released from cylinder 212 so that spring 216 will force rod 213 downwardly to engage point 210 with rail 66. Should the beam 50 tend to creep, due to leakage in the hydraulic system or any other cause, pendulum 205 will thereupon be swung in one direction or the other to cause one or the other cams 208 to operate its associated switch 203. This will, in turn, through the valves 160 or 170, apply a corrective power impulse to actuator 135—140 to restore beam 50 to the pre-set position.

*Other features*

Figure 15:
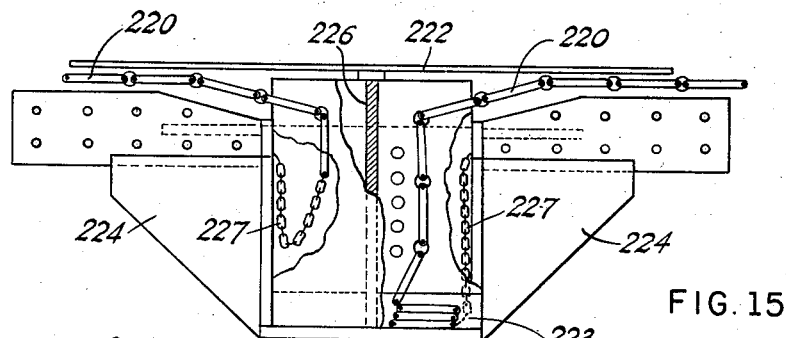
Fig. 15 is an elevation view, partly in section, of storage means for foldable safety platforms associated with each manipulator unit.

A feature of the invention is the provision of safety platforms between lower beam 50 and the sides of pit 32 and closing the spaces between the manipulating units during movement of the latter relatively to beam 50. Referring to Figs. 1, 3A, 3B, and 15, these safety platforms comprise a series of hingedly interconnected and foldable slats 220 which ride along guides 221 adjacent the walls of pit 32 and along the rails 68 on lower beam 50. Adjacent its mid portion, beam 50 carries fixed platforms 222 projecting from each side thereof and overlying the slats 220. At their outer ends, the foldable platforms 220 are each secured to manipulating units 70. Beneath platforms 222, a well 223 is supported on each side of beam 50, each well being braced by gussets 224. Each well also has a central dividing partition 226 therein, and the ends of the platforms are connected by chains to the well. As the manipulating units 70 move relatively toward the center of beam 50, the slat sections 220 fold into the associated well 223 as indicated in Fig. 15, and as the units 70 move away from the center of the lower beam, the platform slats 220 are drawn out of the well 223. Thus, a continuous platform extending between the beam 50 and the sides of pit 32 is always provided between the center of beam 50 and each manipulating unit 70.

Figure 16:
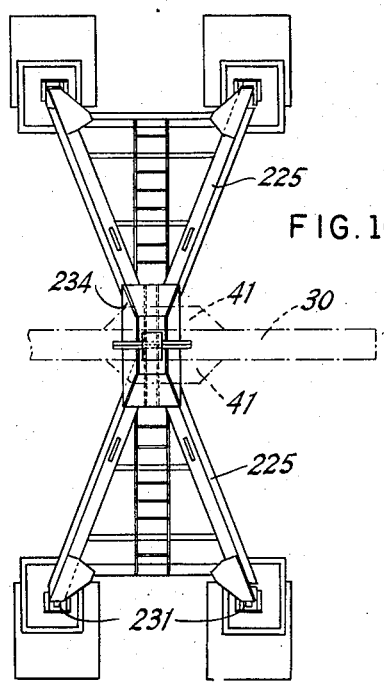
Figs. 16, 17 and 18 are, respectively, plan, side elevation, and end elevation views of stationary supports for the upper beam when removed from the press.
Figure 17:
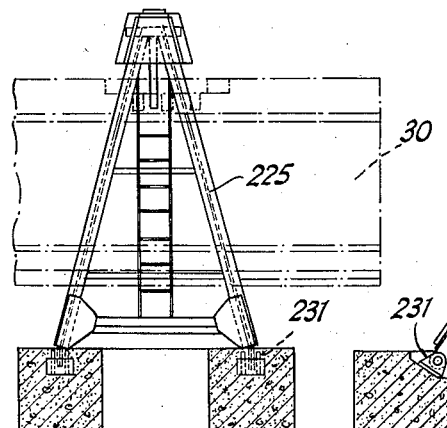
Figure 18:
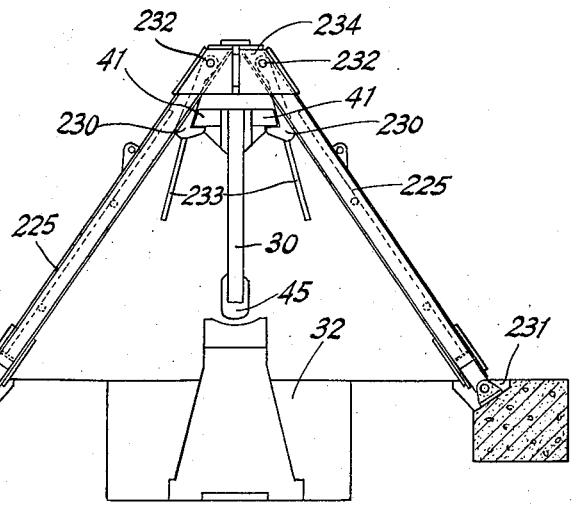

In order to free the lower beam 50 and the manipulating units 70 for further operations after removing the upper beam 30 from the press, stationary supporting frames 225 are provided alongside the pit 32, preferably at four pre-set locations, with two frames being on each side of the pit. Referring to Figs. 16, 17 and 18, each of these supporting frames comprises a generally triangular structure having its legs pivotally mounted in supports 231 adjacent the upper edges of pit 32. The apex of each frame is provided with a transverse pintle 232 on each of which is swingably mounted a hook 230 having an operating handle 233. A hood structure, generally indicated at 234, embraces the upper end of each frame.

When the upper beam 30 has been moved out of the press, supported on the manipulating units 70, the frames 225 are swung inwardly and hooks 230 engage beneath projections 41 on upper beam 30. Actuators 75 of the units 70 are then retracted so that the beam 30 is supported solely by the frames 225, thus freeing the manipulating units and the lower beam for further operations.

*A typical operation*

The operation of the manipulating assembly in handling workpieces relatively to the press is as follows: With the lower beam 50 withdrawn from the press, overhead cranes or the like transport a relatively heavy plate to the vicinity of the press and lower the same on to the lower die 55. This die will have a curvature in its upper surface corresponding to the desired curvature to be imparted to the workpiece.

Figure 19:
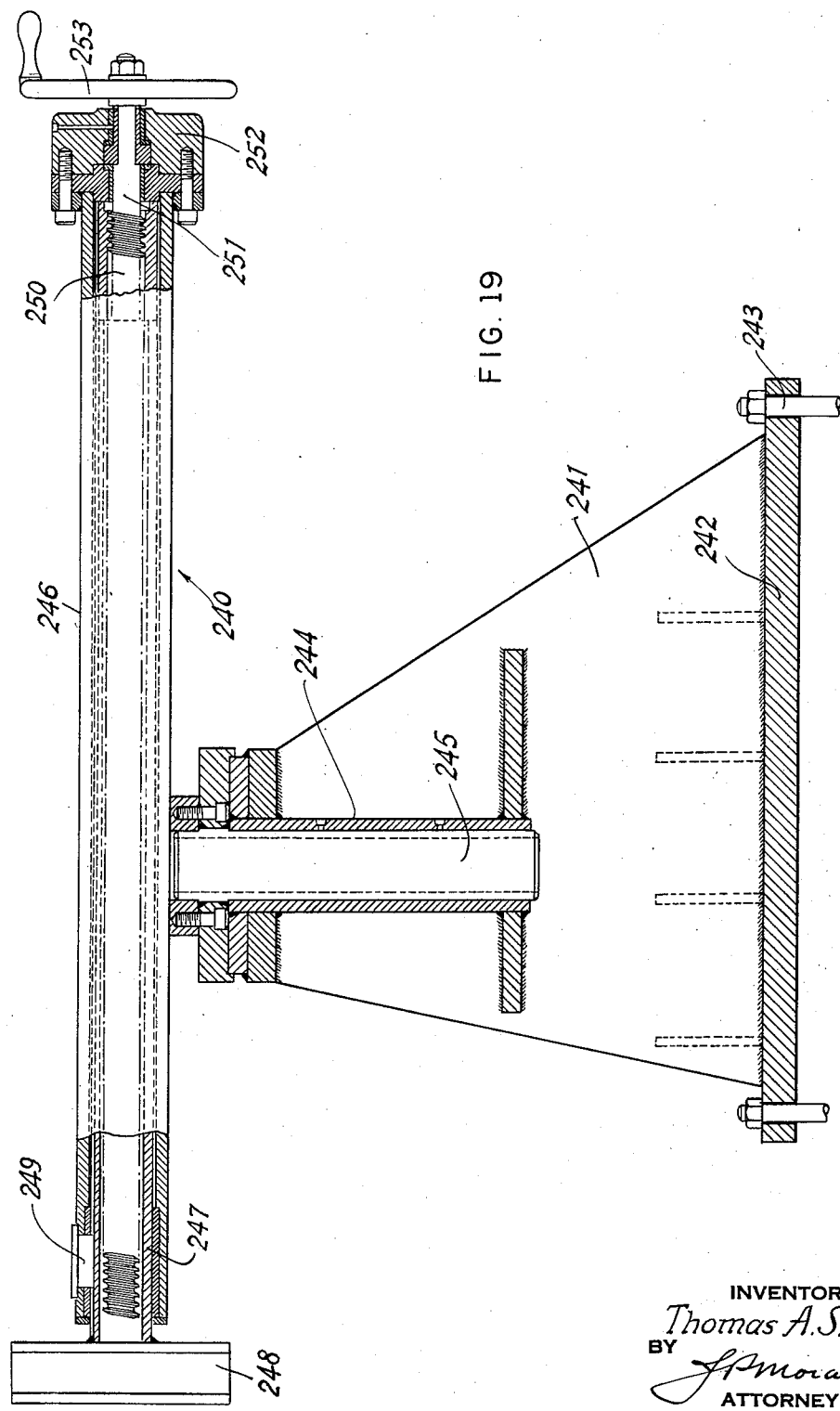
Fig. 19 is an end elevation view, partly in section, of an adjustable work positioning gauge associated with the lower beam.

To properly center the workpiece onto die 55, a pair of feeler gauges 240 are mounted alongside pit 32 adjacent the longitudinal center line thereof. One of these gauges is shown more particularly in Fig. 19. Referring to this figure, a supporting bracket 241 is secured to the working surface 25 alongside pit 32 by virtue of having a bottom plate 242 bolted to the work surface 25 by bolts 243. Bracket 241 supports a vertically arranged tubular bearing 244 which receives a spindle 245. Secured to the upper end of spindle 245, and extending substantially horizontally, is a guide tube 246 in which is slidably mounted an internally threaded sleeve 247. The outer end of sleeve 247 carries a vertically extending feeler bar 248. Sleeve 247 is held against rotation by a key 249, and a threaded shaft 250 is mounted within the sleeve. This threaded shaft has a reduced outer end 251 extending through a bearing assembly, generally indicated at 252, secured to the outer end of guide sleeve 246, and an operating handle 253 is fastened on the outer end of screw 250.

The guide tube 246 and its contained elements may be swung in a horizontal plane about the axis of the spindle 245 and may be selectively latched, by means not shown, in a position perpendicular to the line of travel of lower beam 50. By means of suitable graduations (not shown) on threaded sleeve 247, the feeler bar 248 may be positioned a set distance relative to the center line of lower beam 50, this positioning being effected by operating handle 253 rotating screw 250 to advance or retract threaded sleeve 247 and feeler bar 248. When the crane positions the workpiece longitudinally on die 55, the edge of the work piece will engage the feeler bars 248 so that the workpiece will be on the die in the proper lateral position. The manipulating units 70 are then individually or collectively shifted to the proper position longitudinally of the workpiece to engage the latter for manipulation during the pressing operation. For this purpose, the workpieces have U-shaped clips welded to their edges for engagement by the hooks 40 of the actuators.

The ram 135—140 is then operated to move the lower beam into the press 20. Depending upon the length of the workpiece being operated upon, the lower beam 50 may be centered in the press, or may be off-centered one way or the other longitudinally of the press, the ram 135—140 being designed to move the lower beam a short distance beyond the center line of the press. This allows maximum pressure to be applied to the ends of a plate by shifting the lower beam longitudinally of the central position to bring the ends of the plate directly under the upper platen of the press.

When the beam, with the workpiece thereon, has been properly positioned in the press, the manipulating elements are retracted laterally and downwardly relative to the workpiece so as not to interfere with movement of the press. Generally, an initial bending is formed in the plate adjacent one longitudinal edge thereof, after which the manipulating units are operated to shift the workpiece laterally of the die so that a series of successive bends may be formed therein to curve the plate to the desired curvature. Should the workpiece be offset laterally of the die during such bending, the offset side is supported by the manipulating units on that side during the bending operation.

If desired, press operating controls may be provided at the main control panel 190 so that both the operation of the press and the manipulating of the workpiece may be controlled from a single position.

While a specific embodiment of the invention has been shown and described in detail to illustrate the application of the invention principles, it will be understood that the invention may be embodied otherwise without departing from such principles.

What is claimed is:

1. In combination with a relatively heavy duty metal working press having a generally vertically extending frame structure supporting a vertically movable horizontally elongated upper press platen and actuator means for the platen; an upper beam disengageably connectible to the upper platen for vertical reciprocation by the actuator means; a lower beam mounted for horizontal movement into and out of operative relation with said upper beam; and a plurality of movable work manipulating units operatively associated with said lower beam, said units being individually selectively connectible to said lower beam for movement thereby and selective positioning relative to said lower beam and its path of movement; said units being extensible above said lower beam to selectively position work pieces thereon for working by said press and to engage and support said upper beam for transporting the latter into and out of the press.

2. In combination with a relatively heavy duty metal working press having a generally vertically extending frame structure supporting a vertically movable horizontally elongated upper press platen and actuator means for the platen; an upper beam disengageably connectible to the upper platen for vertical reciprocation by the actuator means; a lower beam mounted for horizontal movement into and out of operative relation with said upper beam; a plurality of movable work manipulating units operatively associated with said lower beam, said units being individually selectively connectible to said lower beam for movement thereby and selective positioning relative to said lower beam and its path of movement; said units being extensible above said lower beam to selectively position work pieces thereon for working by said press and to engage and support said upper beam for transporting the latter into and out of the press; and a plurality of supports arranged along the path of movement of said lower beam outside said press to receive said upper beam, when the latter is moved out of said press by said lower beam and said manipulator units, and support said upper beam in vertically spaced relation to said lower beam.

3. In combination with a relatively heavy duty metal working press having a generally vertically extending frame structure supporting a vertically movable upper work engaging means and actuator means for said work engaging means, and having a lower work supporting means movable horizontally into and out of the press; a plurality of movable manipulating units operatively associated with said work supporting means, said units being individually selectively connectible to said work supporting means for movement thereby and selective positioning relative to the same and its path of movement; said units being extensible relatively to said work supporting means to selectively position work pieces thereon for working by said press.

4. In combination with a relatively heavy duty metal working press having a generally vertically extending frame structure supporting a vertically movable upper press platen and actuator means for the platen, and having a lower beam movable horizontally into and out of the press; a plurality of carriages mounted for movement on guides extending along either side of the path of movement of said lower beam; an upwardly extensible manipulator unit supported on each of said carriages to position and adjust work pieces on said lower beam; and means selectively operable to individually clamp said carriages to said guides or to said lower beam for selective positioning along said lower beam.

5. In combination with a relatively heavy duty metal working press having a generally vertically extending frame structure supporting a vertically movable upper press platen and actuator means for the platen, and having a lower beam movable horizontally into and out of the press; a plurality of carriages mounted for movement on guides extending along either side of the path of movement of said lower beam; an upwardly extensible manipulator unit supported on each of said carriages for tilting movement toward said lower beam to position and adjust work pieces on said lower beam; and means selectively operable to individually clamp said carriages to said guides or to said lower beam for selective positioning along said lower beam.

6. In combination with a relatively heavy duty metal working press having a generally vertically extending frame structure supporting a vertically movable upper press platen and actuator means for the platen, and having a lower beam movable horizontally into and out of the press; a cylinder connected for movement with said lower beam and extending parallel to the direction of movement thereof; a piston movable in said cylinder; a tubular piston rod secured to said piston and having ports adjacent said piston connecting the space between said cylinder and said rod to the interior of said rod, said rod being fixed, at its outer end, against movement relative to the press; a source of fluid under pressure connected to the interior of said piston rod; and means movable with said lower beam controlling application of pressure fluid from the interior of said cylinder outwardly of said piston to the interior of said cylinder inwardly of said piston.

7. In combination with a relatively heavy duty metal working press having a generally vertically extending frame structure supporting a vertically movable upper press platen and actuator means for the platen, and having a lower beam movable horizontally into and out of the press; a cylinder connected for movement with said lower beam and extending parallel to the direction of movement thereof; a piston movable in said cylinder; a tubular piston rod secured to said piston and having ports adjacent said piston connecting the space between said cylinder and said rod to the interior of said rod, said rod being fixed, at its outer end, against movement relative to the press; a source of fluid under pressure connected to the interior of said piston rod; means movable with said lower beam controlling application of pressure fluid from the interior of said cylinder outwardly of said piston to the interior of said cylinder inwardly of said piston; a plurality of carriages mounted for movement on guides extending along either side of the path of movement of said lower beam; an upwardly extensible pressure fluid operated manipulator unit supported on each of said carriages to position and adjust work pieces on said lower beam; means selectively operable to individually clamp said carriages to side guides or to said lower beam for selective positioning along said lower beam; and means, including telescoped conduit sections, connecting each unit to the space between said cylinder and said piston rod for supply of pressure fluid to said units.

8. In combination with a relatively heavy duty metal working press having a generally vertically extending frame structure supporting a vertically movable upper press platen and actuator means for the platen, and having a lower beam movable horizontally into and out of the press; a cylinder connected for movement with said lower beam and extending parallel to the direction of movement thereof; a piston movable in said cylinder; a tubular piston rod secured to said piston and having ports adjacent said piston connecting the space between said cylinder and said rod to the interior of said rod, said rod being fixed, at its outer end, against movement relative to the press; a source of fluid under pressure connected to the interior of said piston rod; means movable with said lower beam controlling application of pressure fluid from the interior of said cylinder outwardly of said piston to the interior of said cylinder inwardly of said piston; and a return manifold, including telescoped sections, connecting the interior of said cylinder inwardly of said piston to said source.

9. In combination with a relatively heavy duty metal working press having a generally vertically extending frame structure supporting a vertically movable upper press platen and actuator means for the platen, and having a lower beam movable horizontally into and out of the press; a cylinder connected for movement with said lower beam and extending parallel to the direction of movement thereof; a piston movable in said cylinder; a tubular piston rod secured to said piston and having ports adjacent said piston connecting the space between said cylinder and said rod to the interior of said rod, said rod being fixed, at its outer end, against movement relative to the press; a source of fluid under pressure connected to the interior of said piston rod; means movable with said lower beam controlling application of pressure fluid from the interior of said cylinder outwardly of said piston to the interior of said cylinder inwardly of said piston; a return manifold, including telescoped sections, connecting the interior of said cylinder inwardly of said piston to said source; a plurality of carriages mounted for movement on guides extending along either side of the path of movement of said lower beam; an upwardly extensible pressure fluid operated manipulator unit supported on each of said carriages to position and adjust work pieces on said lower beam; means selectively operable to individually clamp said carriages to said guides or to said lower beam for selective positioning along said lower beam; means including telescoped conduit sections, connecting each unit to the space between said cylinder and said piston rod for supply of pressure fluid to said units; and means, including telescoped conduit sections, connecting each unit to said return manifold, for exhaust of pressure fluid from said units.

10. In combination with a relatively heavy duty metal working press having a generally vertically extending frame structure supporting a vertically movable upper press platen and actuator means for the platen, and having a lower beam movable horizontally into and out of the press; a cylinder connected for movement with said lower beam and extending parallel to the direction of movement thereof; a piston movable in said cylinder; a tubular piston rod secured to said piston and having ports adjacent said piston connecting the space between said cylinder and said rod to the interior of said rod, said rod being fixed, at its outer end, against movement relative to the press; a source of fluid under pressure connected to the interior of said piston rod; means movable with said lower beam controlling application of pressure fluid from the interior of said cylinder outwardly of said piston to the interior of said cylinder inwardly of said piston; a return manifold, including telescoped sections, connecting the interior of said cylinder inwardly of said piston to said source; a plurality of carriages mounted for movement on guides extending along either side of the path of movement of said lower beam; a pair of aligned spaced bearings on each of said carriages; upwardly extending, pressure fluid operated, work manipulating units, each having a pair of trunnions mounted in a pair of said bearings for tilting movement toward said lower beam to position and adjust work pieces on said lower beam; pressure fluid passage means in said trunnions connecting the pressure fluid working spaces of each unit to the respective trunnion bearings; means, including telescoped conduit sections, connecting one bearing of each carriage to the space between said cylinder and said piston rod for supply of pressure fluid to said units; and means, including telescoped conduit sections, connecting the other bearing of each carriage to said return manifold, for exhaust of pressure fluid from said units.

11. In combination with a relatively heavy duty metal working press having a generally vertically extending frame structure supporting a vertically movable upper press platen and actuator means for the platen, and having a lower beam movable horizontally into and out of the press; a cylinder connected for movement with said lower beam and extending parallel to the direction of movement thereof; a piston movable in said cylinder; a tubular piston rod secured to said piston and having ports adjacent said piston connecting the space between said cylinder and said rod to the interior of said rod, said rod being fixed, at its outer end, against movement relative to the press; a source of fluid under pressure connected to the interior of said piston rod; means movable with said lower beam controlling application of pressure fluid from the interior of said cylinder outwardly of said piston to the interior of said cylinder inwardly of said piston; a return manifold, including telescoped sections, connecting the interior of said cylinder inwardly of said piston to said source; a plurality of carriages mounted for movement on guides extending along either side of the path of movement of said lower beam; a pair of aligned spaced bearings on each of said carriages; upwardly extending, pressure fluid operated, work manipulating units, each having a pair of trunnions mounted in a pair of said bearings for tilting movement toward said lower beam to position and adjust work pieces on said lower beam; pressure fluid passage means in said trunnions connecting the pressure fluid working spaces of each unit to the respective trunnion bearings; means, including telescoped conduit sections, connecting one bearing of each carriage to the space between said cylinder and said piston rod for supply of pressure fluid to said units; means, including telescoped conduit sections, connecting the other bearing of each carriage to said return manifold, for exhaust of pressure fluid from said units; pressure fluid operated actuator means connected between each unit and its associated carriage to tilt the unit; and means controlling supply and exhaust of pressure fluid to each actuator means.

12. In combination with a relatively heavy duty metal working press having a generally vertically extending frame structure supporting a vertically movable upper press platen and actuator means for the platen, and having a lower beam movable horizontally into and out of the press; a cylinder connected for movement with said lower beam and extending parallel to the direction of movement thereof; a piston movable in said cylinder; a tubular piston rod secured to said piston and having ports adjacent said piston connecting the space between said cylinder and said rod to the interior of said rod, said rod being fixed, at its outer end, against movement relative to the press; a source of fluid under pressure connected to the interior of said piston rod; means movable with said lower beam controlling application of pressure fluid from the interior of said cylinder outwardly of said piston to the interior of said cylinder inwardly of said piston; a return manifold, including telescoped sections, connecting the interior of said cylinder inwardly of said piston to said source; a plurality of carriages mounted for movement on guides extending along either side of the path of movement of said lower beam; a pair of aligned spaced bearings on each of said carriages; upwardly extending, pressure fluid operated, work manipulating units, each having a pair of trunnions mounted in a pair of said bearings for tilting movement toward said lower beam to position and adjust work pieces on said lower beam; pressure fluid passage means in said trunnions connecting the pressure fluid working spaces of each unit to the respective trunnion bearings; means, including telescoped conduit sections, connecting one bearing of each carriage to the space between said cylinder and said piston rod for supply of pressure fluid to said units; means, including telescoped conduit sections, connecting the other bearing of each carriage to said return manifold, for exhaust of pressure fluid from said units; pressure fluid operated actuator means connected between each unit and its associated carriage to tilt the unit, and each having trunnions mounted in bearings on the associated carriage; said last-named trunnions having passage means therethrough connected to the pressure fluid working spaces of the actuator means; and means controlling supply of pressure fluid to one trunnion of each actuator means and exhaust pressure fluid from the other trunnion thereof.

13. In combination with a relatively heavy duty metal working press having a generally vertically extending frame structure supporting a vertically movable horizontally elongated upper press platen and actuator means for the platen, and having an elongated relatively massive lower beam movable horizontally into and out of the press along a horizontally elongated supporting surface; a pair of elongated ways for said beam projecting above said surface and extending therealong and through said press; said ways being in elongated spaced relation to each other and one way being substantially centered relative to said press, and the spacing between said ways being substantially less than the length of said lower beam; said one way being shorter than said lower beam whereby, when said lower beam is supported solely on said one way, its overhanging ends may deflect freely under loads applied by said press.

14. In combination with a relatively heavy duty metal working press having a generally vertically extending frame structure supporting a vertically movable horizontally elongated upper press platen and actuator means for the platen, and having an elongated relatively massive lower beam movable horizontally into and out of the press along a horizontally elongated supporting surface; a pair of elongated ways for said beam projecting above said surface and extending therealong and through said press; said ways being in elongated spaced relation to each other and one way being substantially centered relative to said press, and the spacing between said ways being substantially less than the length of said lower beam; said one way being shorter than said lower beam whereby, when said lower beam is supported solely on said one way, its overhanging ends may deflect freely under loads applied by said press; said lower beam having runners bearing on said ways and the ends of said runners being convexly curved in a vertical plane to facilitate transfer of said lower beam from one of said ways to the other thereof.

15. In combination with a relatively heavy duty metal working press having a generally vertically extending frame structure supporting a vertically movable horizontally elongated upper press platen and actuator means for the platen; a horizontally elongated upper beam disengageably connectible to the upper platen for vertical reciprocation by the actuator means, said upper beam having projections extending along either side thereof adjacent and substantially parallel to its top edge; a plurality of upwardly extending manipulating units individually movable laterally relative to the press; and a lifting element mounted on the upper end of each unit for engagement with one of said projections whereby, said units are cooperative with said upper beam to position the latter relative to the press.

16. In combination with a relatively heavy duty metal working press having a generally vertically extending frame structure supporting a vertically movable horizontally elongated upper press platen and actuator means for the platen; a horizontally elongated upper beam disengageably connectible to the upper platen for vertical reciprocation by the actuator means, said upper beam having projections extending along either side thereof adjacent and substantially parallel to its top edge; a plurality of upwardly extending manipulating units individually movable laterally relative to the press; a lifting element mounted on the upper end of each unit for engagement with one of said projections, whereby said units are cooperative with said upper beam to position the latter relative to the press; said units being movable in a pair of spaced paths parallel to the length of said upper beam; and a plurality of upwardly extending supports arranged alongside said paths and each having a lifting element on its upper end; the supports along each path being tiltable toward the supports along the other path to engage said last named lifting elements with said projections to receive and support said upper beam when the latter is moved out of the press by said units.

17. In combination with a relatively heavy duty metal working press having a generally vertically extending frame structure supporting a vertically movable upper work engaging means and actuator means for said work engaging means, and having a lower work support movable horizontally into and out of the press along a horizontal supporting surface; actuator means for said support; a detector element swingably mounted on said support for oscillation in a vertical plane parallel to the path of movement of said support, the outer end of said element being selectively projectable against said supporting surface;

and actuator control mechanism operable by said element, upon oscillation thereof due to movement of said support relative to a point of such surface engaged by said element, to activate said actuator means to restore said support to its selected position.

18. In combination with a relatively heavy duty metal working press having a generally vertically extending frame structure supporting a vertically movable upper work engaging means and actuator means for the work engaging means, and having a lower work support movable horizontally into and out of the press; means arranged along the path of movement of said support and selectively and adjustably projectible toward the latter to engage an edge of a work member thereon to selectively position the work member laterally of said support.

19. In combination with a relatively heavy duty metal working press having a generally vertically extending frame structure supporting a vertically movable upper work engaging means and actuator means for the work engaging means, and having a lower work support movable horizontally into and out of the press along a supporting surface; power mechanism for moving said support relatively to the press; control means for said power mechanism; and a detector movably mounted on said support and selectively engageable with said supporting surface in a selected position of said support relative to the press; said detector operating said control means to apply a position restoring power impulse to said support upon movement of the latter from such selected position.

References Cited in the file of this patent

UNITED STATES PATENTS

| 509,265 | Tweddell et al. | Nov. 21, 1893 |
| 568,453 | McNaughton et al. | Sept. 29, 1896 |
| 1,311,539 | Thomas | July 29, 1919 |
| 1,698,904 | Baker | Jan. 5, 1929 |
| 1,935,854 | McCreary | Nov. 21, 1933 |
| 2,259,576 | MacMillin | Oct. 21, 1941 |
| 2,275,561 | Sahlin | Mar. 10, 1942 |
| 2,487,966 | Engel | Nov. 15, 1949 |
| 2,505,718 | Nowak | Apr. 25, 1950 |
| 2,667,853 | Ingersoll | Feb. 2, 1954 |

FOREIGN PATENTS

| 678,935 | Germany | July 25, 1939 |